US009860201B2

(12) United States Patent
Chiu et al.

(10) Patent No.: US 9,860,201 B2
(45) Date of Patent: Jan. 2, 2018

(54) INFORMATION PROCESSING SYSTEM, INFORMATION PROCESSING METHOD, AND NON-TRANSITORY COMPUTER READABLE STORAGE MEDIUM THEREOF

(71) Applicant: INSTITUTE FOR INFORMATION INDUSTRY, Taipei (TW)

(72) Inventors: Chien-Chung Chiu, Yilan County (TW); Jing-Ming Chiu, Taipei (TW); Ren-Dar Yang, Hsinchu (TW); Hsiao-Chen Chang, Taipei (TW); Yeh-Kuang Wu, New Taipei (TW); Wen-Tai Hsieh, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 499 days.

(21) Appl. No.: 14/555,677

(22) Filed: Nov. 27, 2014

(65) Prior Publication Data
US 2016/0142351 A1    May 19, 2016

(30) Foreign Application Priority Data
Nov. 17, 2014   (TW) .............................. 103139792 A

(51) Int. Cl.
*G06F 15/00*       (2006.01)
*G06F 13/00*       (2006.01)
*H04L 12/58*       (2006.01)

(52) U.S. Cl.
CPC .............. *H04L 51/08* (2013.01); *H04L 51/18* (2013.01)

(58) Field of Classification Search
CPC .......................... G06Q 30/02; G06F 17/30879
(Continued)

(56) References Cited

U.S. PATENT DOCUMENTS

2005/0011958 A1* 1/2005 Fukasawa ......... G06F 17/30879
                                                  235/462.46
2012/0223131 A1* 9/2012 Lim .................. G06F 17/30879
                                                  235/375
(Continued)

FOREIGN PATENT DOCUMENTS

CN        103268328 A      8/2013
JP        2009-015823 A    1/2009
(Continued)

OTHER PUBLICATIONS

The examination report of the corresponding Taiwan application.
(Continued)

*Primary Examiner* — Kevin Nguyen
(74) *Attorney, Agent, or Firm* — CKC & Partners Co., Ltd.

(57) ABSTRACT

An information processing system includes a register module, a determining module, and a transfer module. The register module is configured to store event data corresponding to a specific QR code. The determining module is configured to obtain the event data, and to communicate with a mobile device, so as to determine whether application programs on the mobile device includes a first application program which is corresponding to any one of the event data. If yes, the determining module transmits launch information to make the mobile device lunch the first application program. If not, the determining module transmits install information to make the mobile device install the first application program. The transmitting module is configured to transmit a message corresponding to the first application program to the mobile device, so that the first application program launched by the mobile device displays the message.

22 Claims, 3 Drawing Sheets

(58) Field of Classification Search
USPC .................. 715/763–765, 851, 853, 740, 744
See application file for complete search history.

(56) References Cited

U.S. PATENT DOCUMENTS

| | | | |
|---|---|---|---|
| 2013/0043302 A1* | 2/2013 | Powlen .................. | G06Q 50/01 235/375 |
| 2013/0204690 A1* | 8/2013 | Liebmann .......... | G06Q 30/0225 705/14.26 |
| 2013/0256403 A1* | 10/2013 | MacKinnon Keith ... | G06K 5/00 235/375 |
| 2014/0034722 A1 | 2/2014 | Han | |
| 2014/0188645 A1* | 7/2014 | Dimokas .............. | G06Q 20/202 705/21 |

FOREIGN PATENT DOCUMENTS

| | | |
|---|---|---|
| JP | 2009-282896 A | 12/2009 |
| JP | 2011-258086 A | 12/2011 |
| WO | 2007/132748 A1 | 11/2007 |
| WO | 2013/065165 A1 | 5/2013 |
| WO | 2015008144 A2 | 1/2015 |

OTHER PUBLICATIONS

The examination report of the corresponding UK application dated May 21, 2015(application No. GB1421366.4).
The office action of the corresponding Japan application dated May 31, 2016.

* cited by examiner

INFORMATION PROCESSING SYSTEM, INFORMATION PROCESSING METHOD, AND NON-TRANSITORY COMPUTER READABLE STORAGE MEDIUM THEREOF

RELATED APPLICATIONS

This application claims priority to Taiwan Application Serial Number 103139792, filed Nov. 17, 2014, which is herein incorporated by reference.

BACKGROUND

Technical Field

The present disclosure relates to an information processing system. More particularly, the present disclosure relates to the information processing, system applied to Quick Response code (QR code).

Description of Related Art

These days, a variety of applications using the QR code are widely spread. For example, a retailer or a marketer often prints the QR code on fliers such that consumers can read the QR code by an electronic device to obtain specific information of a publicity activity.

However, in current applications, the retailer the marketer needs to register a QR code on publicity materials for each activity so that the consumers can acquire related information of different activities or different products. Therefore, since the QR codes are different, the marketer needs to print different QR codes on different publicity materials, respectively, and the publicity cost are thus increased. Moreover, a deadline usually presented for activities or selling products, when the deadline is passed, the update of a message page corresponding to the QR codes is stopped or failed with end of the publicity activity, the QR codes usually cannot be reused, and consumers cannot require that the message corresponding to the QR codes is expired, resulting in a low utility of the QR codes.

SUMMARY

Therefore, improving the utility of the QR code application and simultaneously decreasing the publicity cost of the QR code application is an important research topic and is also an object to be improved in the related art.

One aspect of the disclosure provides an information processing system. The information process system communicates with a mobile device through a communication network, and provides a message corresponding to a specific QR code to the mobile device. Application programs and a QR code decoding program are installed on the mobile device, and the QR code decoding program is configured to read the specific QR code such that the mobile device communicates with the information processing system through the communication network. The information processing system includes a register module, a determining module and a transmitting module. The register module is configured to record event data corresponding to the specific QR code. The determining module is configured to obtain the event data, and communicate with the mobile device to determine whether the application programs include a first application program corresponding to any one of the event data. If the application programs include the first application program, the determining module transmits launch information to make the mobile device launch the first application program; and otherwise the determining module transmits installation information to make the mobile device install the first application program. The transmitting module is configured to transmit the message corresponding to the first application program to the mobile device, such that the first application program launched by the mobile device displays the message.

In one embodiment, the register module is configured to provide a network service providing a register page for a user to input user information, and then provide the user with the specific QR code corresponding to the user.

In one embodiment, the network service further provides an event data creating page for the user to input specific event data and the application program corresponding to the specific event data to add the specific event data into the event data.

In one embodiment, the information processing system further includes a database. The database is configured to store the event data, the first application program and the message. The network service further provides a message updating page for the user to update content of the event data.

In one embodiment, each of the event data includes location information, time information and content information. The determining module further determines whether a location and time of the mobile device match the location information and the time information of one of the event data to decide whether to transmit the message.

In one embodiment, each of the event data includes location information and time information, and the transmitting module further updates the message according to the location information and the time information of each of the event data.

In one embodiment, the register module includes a data collecting unit. The data collecting unit is configured to provide a coding package for a personal host corresponding to the user to collect original data in the person& host and store the original data in the database to update the event data.

In one embodiment, the message includes a website and a message page corresponding to the website, and the first application program launched by the mobile device displays the message page according to the website.

In one embodiment, the coding package is configured to be executed on the personal host to transmit the original data to the database, and correspond the personal host to the website.

Another aspect of the disclosure provides an information processing method. The information processing method includes following steps: recording, by a register module, event data corresponding to a specific QR code; obtaining, by a determining module, the event data and communicating with the mobile device to determine whether application programs on the mobile device includes a first application program corresponding, to any one of the event data; if the application programs includes the first application program, transmitting, by the determining module, launch information to make the mobile device launch the first application program; if the application programs do not include the first application program, transmitting, by the determining module, installation information to make the mobile device install the first application program; and transmitting, by a transmitting module, a message corresponding to the first application program to make the first application program launched by the mobile device display the message.

In one embodiment, the step of recording the event data includes: providing, by the register module, a network service providing a register page for a user to input user information and then providing the user with the specific QR code.

In one embodiment, the network service further provides an event data creating page for the user to input specific event data, the first application program corresponding to the specific event data, and the message to add the specific event data into the event data.

In one embodiment, the information processing method of claim further includes: storing, by a database, the event data, the first application program and the message. The network service further provides a message updating page for the user to update content of the event data.

In one embodiment, each of the event data includes location information, time information and content information, and the step of transmitting the message includes: determining, by the transmitting module. Whether a location and time of the mobile device match the location information and the time information of one of the event data to decide whether to transmit the message.

In one embodiment, each of the event data includes location information and time information, and the step of transmitting the message includes: updating, by the transmitting module, the message according to the location information and the time information of each of he event data.

In one embodiment, the information processing method further includes: providing, by a data collecting unit in the register module, as coding package for as personal host corresponding to the user to collect original data in the personal host; and storing, the original data in the database to update the event data.

In one embodiment, the message includes a website and a message page corresponding to the website, and the step of transmitting the message includes: displaying, by the first application program launched by the mobile device, the message page according to the website. The coding package is configured to be executed on the personal host to transmit the original data to the database, and correspond the personal host to the website.

Another aspect of the disclosure provides a non-transitory computer readable storage medium. The non-transitory computer readable storage medium is for executing an information processing method, and the information processing method includes following steps: recording, by a register module, event data corresponding to a specific QR code; obtaining, by a determining module, the event data and communicating with the mobile device to determine whether application programs of the mobile device includes a first application program corresponding to any one of the event data; if the application programs includes the first application program, transmitting, by the determining module, launch information to make the mobile device launch the first application program; if the application programs do not include the first application program, transmitting, by the determining module, installation information to make the mobile device install the first application program; and transmitting, by a transmitting module, a message corresponding to the first application program to make the first application program launched by the mobile device display the message.

In one embodiment, the step of recording the event data includes: providing, by the register module, a network service providing a register page for a user to input user information and then providing the user with the specific QR code.

In one embodiment, the network service further provides an event data creating page for the user to input specific event data, the first application program corresponding to the specific event data, and the message to add the specific event data into the event data.

In one embodiment, the information processing method further includes: storing, by a database, the event data, the first application program and the message, in which the network service further provides as message updating page for the user to update content of the event data, and each of the event data includes location information, time information and content information. The step of transmitting the message includes: determining, by the transmitting module, whether a location and time of the mobile device match the location information and the time information of one of the event data to decide whether to transmit the message.

In one embodiment, the information processing method further includes: providing, by a data collecting unit in the register module, a coding package for a personal host corresponding to the user to collect original data in the personal host; and storing the original data in the database to update the event data. The step of transmitting the message includes: displaying, by the first application program launched by the mobile device, the message page according to the website, in which the coding package is configured to be executed on the personal host to transmit the original data to the database, and correspond the personal host to the website.

As disused above, in the information processing system, the information processing method and the non-transitory computer readable storage medium provided in the disclosure, a retailer can use a fixed QR code for publicity. The information processing system can update the message for the consumers anytime according to the event data inputted by the retailer, and therefore the timeliness of the message page corresponding to the QR code is significantly improved.

BRIEF DESCRIPTION OF THE DRAWINGS

The present disclosure can be more fully understood by reading the following detailed description of the embodiment, with reference made to the accompanying drawings as follows.

DETAILED DESCRIPTION

Specific embodiments of the present disclosure are further described in detail below with reference to the accompanying drawings, however, the embodiments described are not intended to limit the present invention and it is not intended for the description of operation to limit the order of implementation. Any device with equivalent functions that are produced from a structure formed by a recombination of elements shall fall within the scope of the present invention. Additionally, the drawings are only illustrative and are not drawn to actual size. For easy to understand, same elements in the disclosure will he labeled, with the same symbols.

Regarding to the "first", "second" and so on used in the specification, they are not referred to particular order or sequence and are not intended to limit the present invention. They are only used to distinguish units or operations described, b the same terminologies.

Figure 1:
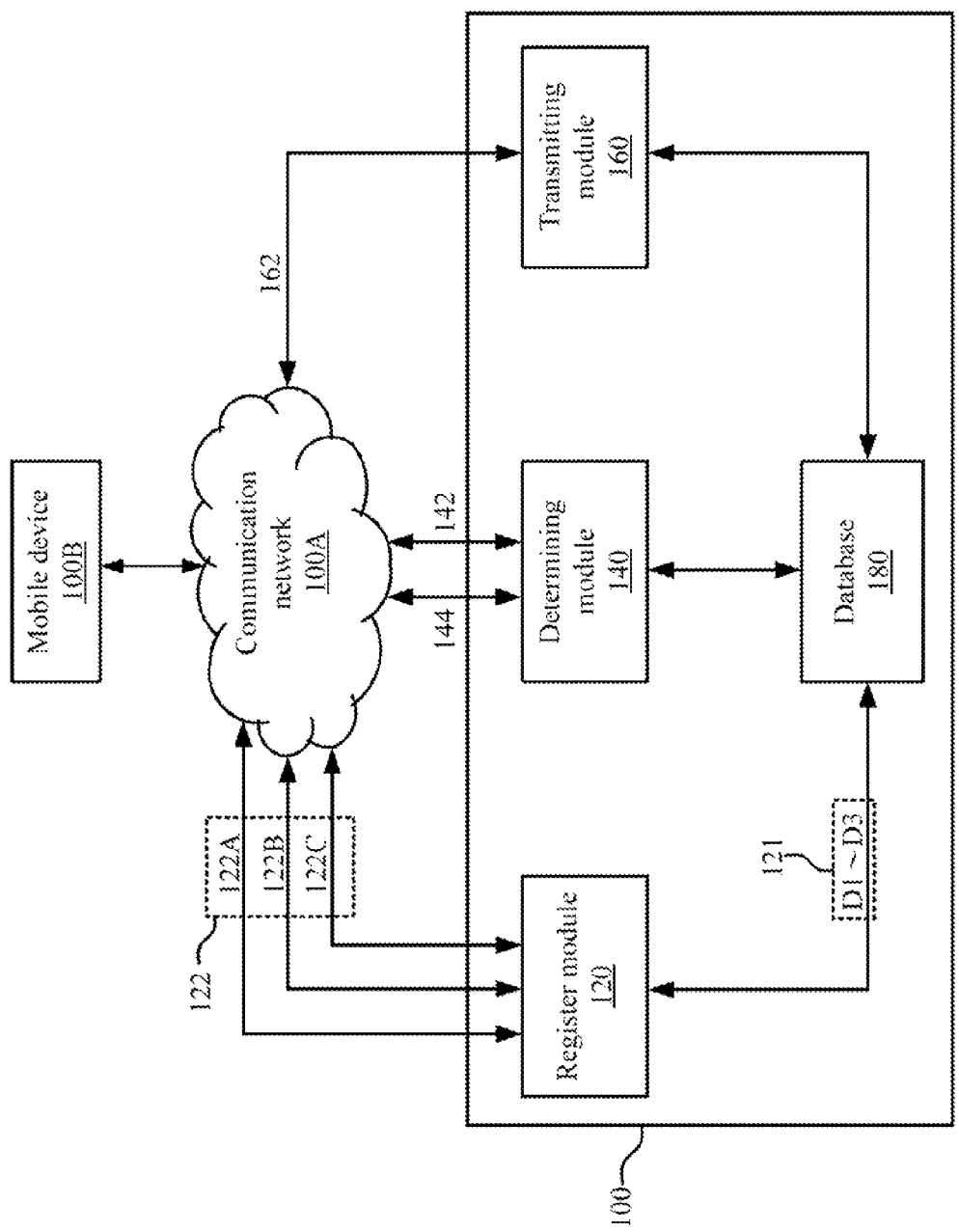
FIG. 1 is a schematic diagram illustrating an information processing system according to an embodiment of the disclosure.

In addition, the "couple" or "connected" in the specification refers that two or more units directly or indirectly connect with each other in a physical way or in an electronic way, or refers to the interaction or interoperation between the two or more wits Referring to FIG. 1, FIG. 1 is a schematic diagram illustrating an information processing system according to an embodiment of the disclosure. As shown in FIG. 1, information processing system 100 communicates with a mobile device 100B through a communication network 100A. In various embodiments, the communication network 100A can be any type of wire or wireless network, and the mobile device 100B can be any type of portable device such as a smart phone, a tablet, a personal digital assistant, a digital camera, or a notebook, etc. These devices are just examples, and the disclosure is not limited thereto In various embodiments, the information processing system 100 is used to provide a message corresponding to a specific QR code for the mobile device 100B. Multiple application programs no shown) and a QR code decoding program are installed on the mobile device 100B. In general, the mobile device 100B can capture the specific QR code by a camera, and read information of the specific QR code by the QR code decoding program to communicate with the information processing system 100 through the communication network 100A. In general, the aforesaid information of the specific QR code includes data required to be communicated with the information processing system 100, such as a website, an image file, or a video file, etc.

As shown in FIG. 1, the information processing system 100 includes a register module 120, a determining module 140, a transmitting module 160 and a database 180. The register module 120 records plural of event data 121 corresponding to a specific QR code. The determining module 140 is coupled to the register module 120, and obtains the event data. The determining module 140 determines whether the application programs in the mobile device 100B includes a first application program (not shown) which can open any corresponding one of the event data 121. If the mobile device 100B has the first application program, then the determining module 140 transmits launch information 142 to the mobile device 100B to launch the first application program. In the contrast, if the mobile device 100B does not have the first application program, the determining module 140 transmits installation information 144 to the mobile device 100B to make the mobile device 100B install the first application program. Moreover, the transmitting module 160 transmits a message 162 corresponding to the first application program to the mobile device 100B to make mobile device 100B displays the message by the first application program. The database 180 is coupled to the register module 120, the determining module 140 and the transmitting module 160. The database 180 stores the event data 121, the first application program and the message 162 corresponding to the specific QR code.

For example, the register module 120 can receive the event data 121 provided by several users (e.g. retailers, marketers, etc.) and provide a fixed specific QR code for each user. Therefore, each user can do publicity of several activities based on the same specific QR code.

In another one embodiment, a first application program, as second application program, and a third application program, etc, respectively corresponding to the event data 121, are initially installed in the mobile device 100B. When the determining module 140 determines that the event data 121 can he executed by the first application program, the second application program, and the third application program of the mobile device 100B, one of those application programs to be executed can be chosen according to a predetermined designated order. Alternatively, a message is transmitted to the mobile device 100B to display these three application programs, and thus users are allowed to choose one application program to be executed from these three application programs.

Furthermore, in a specific embodiment, the mobile device 100B can be connected to the information processing system 100 by reading the specific QR code, and the information processing system 100 can transmit the message 162 corresponding to the QR code read by the mobile device 100B to the mobile device 100B.

For example, the mobile device 100B communicates with the information processing system 100 by reading the QR code. After confirming the mobile device 100B has a web page browser (i.e. the first application program), the determining module 140 transmits a web page (i.e. the message 162) carrying corresponding activity information to the mobile device 100B. Based on the configuration, the users e.g. a retailer, a marketer, etc.) can do the publicity continuously according to the fixed QR code, and the information processing system 100 will automatically update the message 162 corresponding to the QR code according to the event data 121.

As a result, the information processing system 100 can update the content of the message 162 corresponding to the fixed QR code at any time according to the event data 121 inputted, by the users so that the efficiency of the users arranging the publicity activity is increased. Furthermore, because the information processing system 100 can update the content of the message 162 corresponding to the specific QR code at any time, the users need not re-register or creates new QR codes in each new publicity activity. Consequently, the advertising cost of the related publicity activities is decreased.

Several embodiments will be provided in following paragraphs to describe the functions and the applications of the information processing system 100, but the disclosure is not limited to the embodiments.

Reference is made to FIG. 1 again and a flow chart of information processing method of one embodiment of the disclosure is described in the present paragraph. The information processing method can be applied to and performed by the information processing system 100. The information processing method includes following steps: recording the event data 121 corresponding to the specific QR code by the register module 120; afterwards, obtaining plural of event data, and determines whether the mobile device 100B has the first application program corresponding to any one of the event data by the determining module 140; if the mobile device 100B has the first application program, launch information 142 is transmitted to the mobile device 100B to launch the first application program; if the mobile device 100B do not have the first application program, installation information 144 is transmitted to the mobile device 100B to install the required application program (e.g., the first application program); at last, a message 162 corresponding to the first application program is transmitted by the transmitting module 160, so as to make the first application program launched by the mobile device 100B display the message 162.

Figure 2:
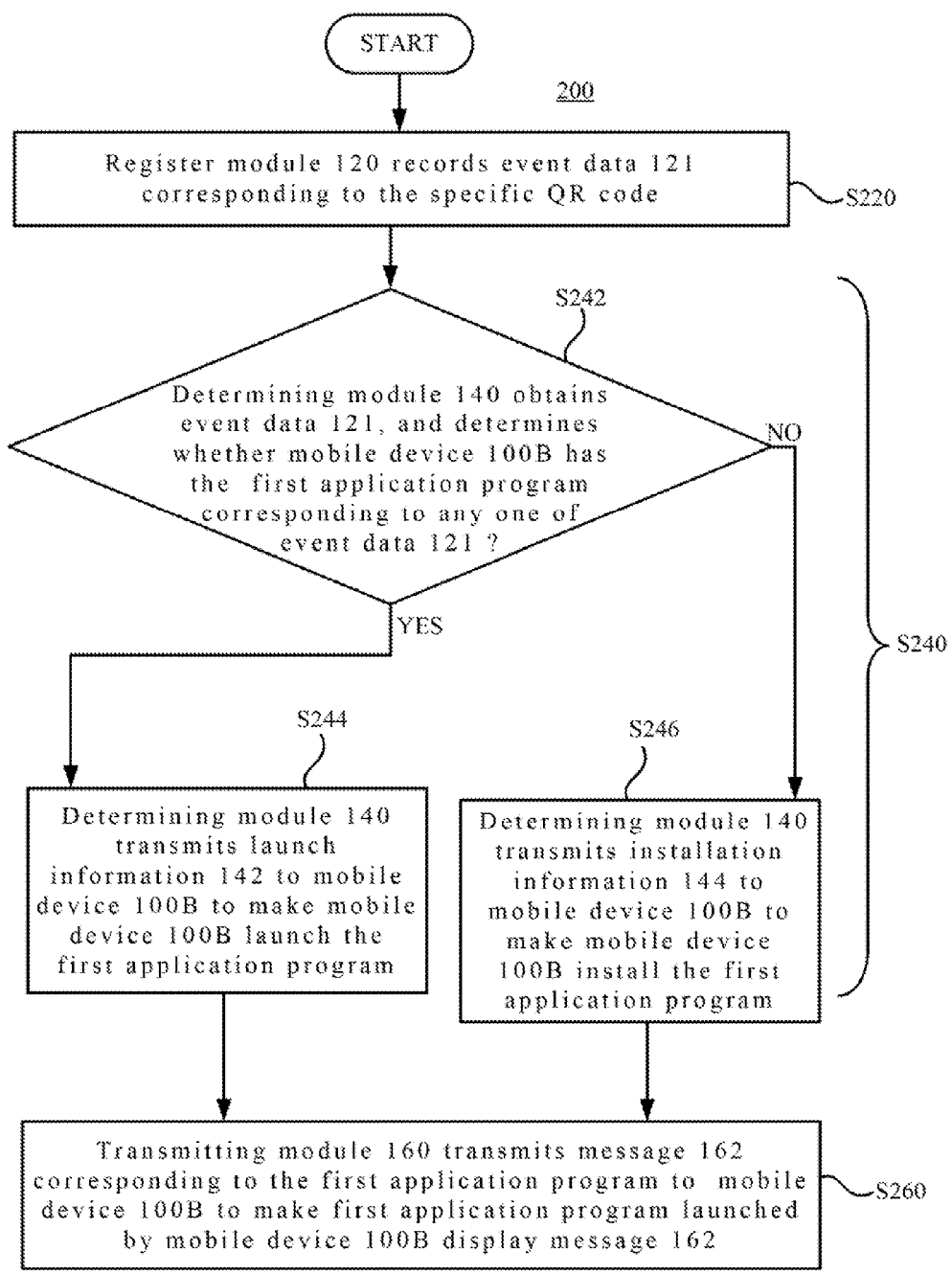
FIG. 2 is a flowchart illustrating an information processing method according to an embodiment of the disclosure.

Referring to FIG. 2, FIG. 2 is a flowchart illustrating an information processing method according to an embodiment of the disclosure. An information processing method 200 is applied for the information processing system 100, but is not limited thereto. Related processes and steps for recording event data 121 of the register module 120 are described in the following paragraphs. For simplicity, reference is made to both of FIG. 1 and FIG. 2, the operations of the information processing system 100 will be described with the information processing method 200.

As shown in FIG. 2, the information processing method. 200 includes a step S220, a step S240 and a step S260. In the step S220, the register module 120 records the event data 121 corresponding to the specific QR code.

For example, as shown in FIG. 1, the register module 120 can provide a network service 122 which includes a register page 122A, an event data creating page 122B and a message updating page 122C.

The register page 122A is used for a user to input user information (not shown), and the register module 120 provides the user with the specific. QR code corresponding to the user after the user inputs the user information. In different embodiments, the user information can include introduction of a retailer, an address, contact information, etc. In other words, the user can register related information through the register page to obtain a fixed QR code.

The event data creating page 122B is for the user to input the event data 121, and input the specific event data (not shown) and the application program corresponding to the specific event data which is added into the event data 121. For example, after registering the user information at the first time,a user inputs the event data 121 corresponding to the publicity activities from January to May in a year through the event data creating page 122B. The user can also input the event data 121 (i.e. the specific event data) corresponding to other publicity activities from June to December in the year through the event data creating page 122B. As a result, the information processing system 100 can update the message to be transmitted to the mobile device 100B at any time according to the event data updated by the user.

The message updating page 122C is for the user to update content of the event data 121 to timely update the content of the corresponding message. For example, after inputting the event data of the publicity activities from January to May in the year, the user wants to modify the content of the event data corresponding to the publicity activities in the February in the year. The user can modify or add the content of the event data 121 through the message updating page 122C.

In various embodiments, the register page 122A, the event data creating page 122B and the message updating page 122C can be implemented by ways of providing web page online forms by a browser. For example, in some embodiments, the register page 122A, the event data creating page 122B and the message updating page 122C are web pages, and can be read by a personal computer or the mobile device 100B. Alternatively, in other embodiments the register page 122A, the event data creating page 122B and the message updating page 122C are built in the first application program or other application programs. Related options of the register page 122A, the event data creating page 122B and the message updating page 122C are displayed by the first application program or other application programs for the user to operate and fill. These embodiments are just examples, and the disclosure is not limited thereto. People skilled in the art should be able to choose other implementations according to practical applications.

Referring to FIG. 2, the step S240 includes a step S242, a step S244, a step S246 and a step S248. In the step S242, the determining module 140 obtains plural of event data, and determines whether the mobile device 100B has the first application program corresponding to any one of the event data 121. If yes, the step S244 is performed. Otherwise, the step S246 is performed. For example, the mobile device 100B can communicate with the information processing system 100 by reading the specific QR code. The information processing system 100 can determine whether the mobile device 100B has the first application program according to the event data 121 corresponding, to the specific QR code and the related first application program.

In the step S244, the determining module 140 transmits the launch information 142 to the mobile device 100B to make the mobile device 100B launch the first application program in the step S246, the determining module 140 transmits the installation information 144 to the mobile device 100B to make the mobile device 100B install the first application program.

In some embodiments, the launch information 142 includes the name of the first application program, related controlling codes, etc. In some embodiments, the installation information includes an installation link of the first application program, such as a website of a software store corresponding to the first application program, in other embodiments, the installation information 144 can be an install package file corresponding to the first application program. The mobile device 100B can read and decompress the install package file to install the first application program. Alternatively, the installation information 144 can be information of linked website, and the mobile device 100B can be automatically linked according the linked website. Thus, the install package file of the first application program is automatically downloaded and is installed by the mobile device 100B. The embodiments are only for illustrative purpose, and the disclosure is not limited thereto.

As shown in FIG. 2, in the step S260, the transmitting module 160 transmits the message 162 corresponding to the first application program to the mobile device 100B to make the first application program launched by the mobile device 100B display the message 162.

For example, a specific retailer inputs the event data 121 through the register module 120 and obtains a fixed QR code. Therefore, the specific retailer can do the publicity by printing the fixed QR code on a number of flyers. The user can read the QR code by utilizing the QR code decoding program in the mobile device 100B and then the mobile device 100B is connected to the information processing system 100. The information processing system 100 can output the corresponding message 162 to the mobile device 100B according to the event data 121 corresponding to the fixed QR code. Consequently, the user can read information related to the latest publicity activity on the mobile device 100B.

In other embodiments, as shown in FIG. 1, the event data 121 includes location information D1, time information D2 and content information D3. In other words, as far as each of the event data 121 is concerned, the content information 133 can be utilized for recording specific content of several publicity activities, the location information D1 can be utilized for recording the locations of the publicity activities, and the time information D2 can be utilized for recording the date or specific time of the publicity activities. Afterwards, the related information, e.g., the location information D1, the time information D2 and the content information D3, of the event data 121 can be updated. Thus, the transmitting module 160 can update the message 162 corresponding to the specific QR code at any time according to the location information D1, time information D2 and content information D3 in each even data. As a result, the user can timely acquire the information related to the publicity activities done by the specific retailer.

Alternatively, in other embodiments, the determining module 140 can determine whether a location and time of the mobile device 100B match the location information D1 and the time information D2 of one of the event data to decide whether to transmit the message. For example, the specific retailer has many branches, and each branch has its own publicity activity. When the mobile device 100B reads the specific QR code, the mobile device 100B also transmits the current time and its location to the information processing system 100. The determining module 140 can select the event data of the branch which is closest to the mobile device 100B according to the location and the time of the mobile device 100B, and output the corresponding message to the mobile device 100B according to the selected event data 121.

In some embodiments, the message 162 includes a website and a message page corresponding to the website. The first application program in the mobile device 100B is linked to the website by reading the specific QR code and displays the message page according to the website to obtain related activity information.

The embodiments are just examples and the disclosure is not limited thereto. It should be understood that the "message" in the specification can be a web page, a video file or an audio file. For example, when the message is the web page, the corresponding first application program is a web browser. When the message is the video file, the corresponding first application program is a video player.

Figure 3:
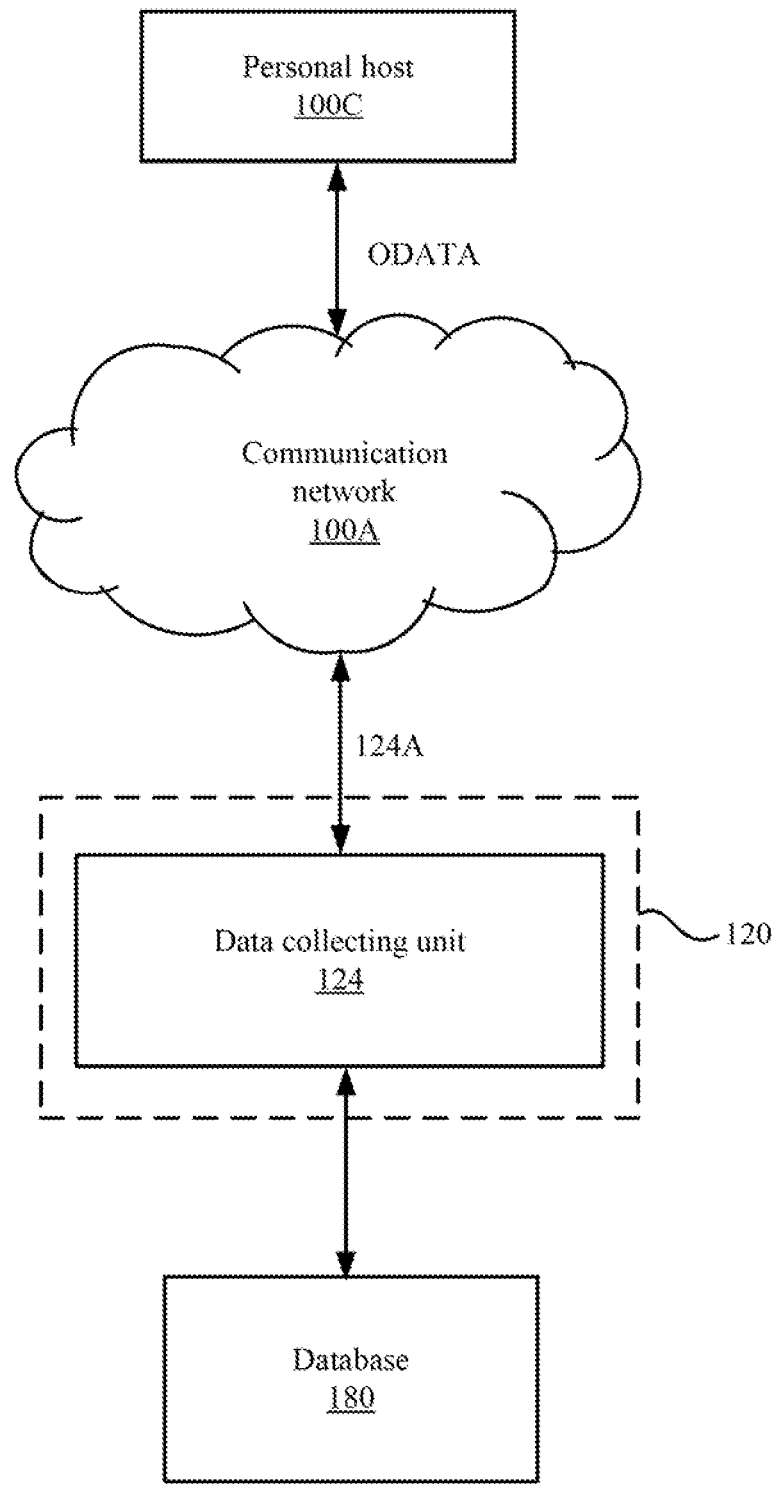
FIG. 3 is a schematic diagram illustrating operations of the register module shown in FIG. 1 according to an embodiment of the disclosure.

Referring to FIG. 1, FIG. 3 is a schematic diagram illustrating operations of the register module shown in FIG. 1 according to an embodiment of the disclosure. As shown in FIG. 3, in some embodiments, the register module 120 further includes a data collecting unit 124. The data collecting unit 124 is coupled between a personal host 100C and the database 180. The data collecting unit 124 is configured to provide a coding package 124A for the personal host 100C to collect original data ODATA in the personal host 100C, and stores the original data ODATA in the database 180 to update the event data 121. In various embodiments, the coding package 124A can be implemented by transferring technology/protocol such as JavaScript, Http head, etc.

For example, the specific retailer has a personal website which records related information (e.g. activity information, retailer introduction, product information, etc.) of the specific retailer, and the personal website is built in the personal host 100C. In this example, the data collecting unit 124 can provide the specific retailer with the coding package 124A, and the personal host 100C executes the coding package 124A. Therefore, the personal host 00C can transmit the original data ODATA in the personal website to the database 180 through executing the coding package 124A to update the event data 121 inputted by the specific retailer in the information processing system 100.

In addition, after the personal host 100C executes the coding package 124A, a mechanism of transferring the website can be added into the personal host 100C for other consumers who are linked to the personal host 100C through the QR code service to be automatically linked to the website provided by the information processing system 100 to acquire the latest activity information. In other words, the specific retailer can efficiently import the data of the pre-built personal website into the database 180 through the data collecting unit 124 and thus the data integrity of the information processing system 100 is improved.

The QR code is taken as an example to describe the embodiments, but the disclosure it not limited to the QR code. Any other type of identification code (e.g. one-dimensional code, two-dimensional code, etc.) can also be implemented in the information processing system 100 and is within the scope of the disclosure.

The specific implementation of the information processing system 100 or the information processing method 200 mentioned above can be software, hardware and/or firmware. For example, if an execution speed and accuracy are the primary considerations, then basically the hardware and/or the firmware is chosen (e.g. using a server, a processing unit or a digital controlling chip) to implement the information processing system 100. The processing unit can be a Central Processing Unit (CPU), a control unit, a micro processor, or other hardware units capable of executing instructions. If a design flexibility is the primary consideration, then basically the software is chosen to implement the information processing system 100. For example, the information processing system 100 is placed in a schedule management tool in a non-transitory computer readable storage medium having the information processing system 100. Alternatively, a collaboration of software, hardware and firmware can be adopted to implement the information processing system 100. The non-transitory computer readable storage medium can be a read only memory, a flash memory, a floppy disk, a hard disk, a compact disc, an USB flash drive, a magnetic tape, a database capable of being accessed on the internet, or other computer readable storage media having the same functions that is obvious to the people skilled in the art. It should be understood that no one is better among the examples above, and the examples are not used to limit the invention. People skilled in the art can flexibly choose the specific implementation of the units according to practical requirements.

In summary, in the information processing system, the information processing method and the non-transitory computer readable storage medium provided by the disclosure, the retailer can use the fixed QR code to do the publicity. The information processing system can update the message shown to the consumers at any time according to the event data inputted by the retailer, and thus the timeliness of the message page corresponding to the QR code is significantly improved.

Although the present disclosure has been described in considerable detail with reference to certain embodiments thereof other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this application provided they fall within the scope of the following claims.

What is claimed is:

1. An information processing system, communicating with a mobile device through a communication network, and providing a message corresponding to a specific QR code for the mobile device, wherein a plurality of application programs and a QR code decoding program are installed on the mobile device, and the QR code decoding program is configured to read the specific QR code such that the mobile device communicates with the information processing system through the communication network, and the information processing system comprises:
  a register module configured to record a plurality of event data corresponding to the specific QR code;
  a determining module configured to obtain the event data, and communicate with the mobile device to determine whether the application programs comprise a first application program corresponding to any one of the event data, wherein if determining that the application programs comprise the first application program, the determining module transmits launch information to make the mobile device launch the first application program; if determining that the application programs do not comprise the first application program, the determining module transmits installation information to make the mobile device install the first application program; and if determining that the application programs comprise the first application program and a second application program, and the first application program and the second application program both correspond to one of the event data, the determining module transmits the launch information to make the mobile device launch one of the first application program and the second application program, or transmits a first message to the mobile device to display the first application program and the second application program for a user to choose; and
  a transmitting module configured to transmit the message corresponding to the first application program to the mobile device, such that the first application program launched by the mobile device displays the message.

2. The information processing system of claim 1, wherein the register module is configured to provide a network service providing a register page for the user to input user information, and then provide the user with the specific QR code corresponding to the user.

3. The information processing system of claim 2, wherein the network service further provides an event data creating page for the user to input specific event data and the application program corresponding to the specific event data to add the specific event data into the event data.

4. The information processing system of claim 3, further comprising:
  a database, configured to store the event data, the first application program and the message,
  wherein the network service further provides a message updating page for the user to update content of the event data.

5. The information processing system of claim 4, wherein each of the event data comprises location information, time information and content information, and the determining module further determines whether a location and time of the mobile device match the location information and the time information of one of the event data to decide whether to transmit the message.

6. The information processing system of claim 4, wherein each of the event data comprises location information and time information, and the transmitting module further updates the message according to the location information and the time information of each of the event data.

7. The information processing system of claim 4, wherein the register module comprises:
  a data collecting unit configured to provide a coding package for a personal host corresponding to the user to collect original data in the personal host and store the original data in the database to update the event data.

8. The information processing system of claim 7, wherein the message comprises a website and a message page corresponding to the website, and the first application program launched by the mobile device displays the message page according to the web site.

9. The information processing system of claim 8, wherein the coding package is configured to be executed on the personal host to transmit the original data to the database, and correspond the personal host to the website.

10. An information processing method, comprising:
  recording, by a register module, a plurality of event data corresponding to a specific QR code;
  obtaining, by a determining module, the event data and communicating with the mobile device to determine whether a plurality of application programs on the mobile device comprises a first application program corresponding to any one of the event data;
  if determining that the application programs comprise the first application program, transmitting, by the determining module, launch information to make the mobile device launch the first application program;
  if determining that the application programs do not comprise the first application program, transmitting, by the determining module, installation information to make the mobile device install the first application program;
  if determining that the application programs comprise the first application program and a second application program, and the first application program and the second application program both correspond to one of the event data, transmitting, by the determining module, the launch information to make the mobile device launch one of the first application program and the second application program, or transmitting a first message to the mobile device to display the first application program and the second application program for a user to choose; and
  transmitting, by a transmitting module, a message corresponding to the first application program to make the first application program launched by the mobile device display the message.

11. The information processing method of claim 10, wherein the step of recording the event data comprises:
  providing, by the register module, a network service providing a register page for the user to input user information and then providing the user with the specific QR code.

12. The information processing method of claim 11, wherein the network service is further configured to provide an event data creating page for the user to input specific event data, the first application program corresponding to the specific event data, and the message to add the specific event data into the event data.

13. The information processing method of claim 12, further comprising:
  storing, by a database, the event data, the first application program and the message,
  wherein the network service further provides a message updating page for the user to update content of the event data.

14. The information processing method of claim 13, wherein each of the event data comprises location information, time information and content information, and the step of transmitting the message comprises:
  determining, by the transmitting module, whether a location and time of the mobile device match the location information and the time information of one of the event data to decide whether to transmit the message.

15. The information processing method of claim 13, wherein each of the event data comprises location information and time information, and the step of transmitting the message comprises:

updating, by the transmitting module, the message according to the location information and the time information of each of the event data.

16. The information processing method of claim 13, further comprising:

providing, by a data collecting unit in the register module, a coding package for a personal host corresponding to the user to collect original data in the personal host; and storing the original data in the database to update the event data.

17. The information processing method of claim 16, wherein the message comprises a website and a message page corresponding to the website, and the step of transmitting the message comprises:

displaying, by the first application program launched by the mobile device, the message page according to the website, wherein the coding package is configured to be executed on the personal host to transmit the original data to the database, and correspond the personal host to the web site.

18. A non-transitory computer readable storage medium for executing an information processing method, the information processing method comprising:

recording, by a register module, a plurality of event data corresponding to a specific QR code;

obtaining, by a determining module, the event data and communicating with the mobile device to determine whether a plurality of application programs of the mobile device comprises a first application program corresponding to any one of the event data;

if determining that the application programs comprise the first application program, transmitting, by the determining module, launch information to make the mobile device launch the first application program;

if determining that the application programs do not comprise the first application program, transmitting, by the determining module, installation information to make the mobile device install the first application program;

if determining that the application programs comprise the first application program and a second application program, and the first application program and the second application program both correspond to one of the event data, transmitting, by the determining module, the launch information to make the mobile device launch one of the first application program and the second application program, or transmitting a first message to the mobile device to display the first application program and the second application program for a user to choose; and transmitting, by a transmitting module, a message corresponding to the first application program to make the first application program launched by the mobile device display the message.

19. The non-transitory computer readable storage medium of claim 18, wherein the step of recording the event data comprises:

providing, by the register module, a network service providing a register page for the user to input user information and then providing the user with the specific QR code.

20. The non-transitory computer readable storage medium of claim 19, wherein the network service further provides an event data creating page for the user to input specific event data, the first application program corresponding to the specific event data, and the message to add the specific event data into the event data.

21. The non-transitory computer readable storage medium of claim 20, wherein the information processing method further comprises:

storing, by a database, the event data, the first application program and the message, wherein the network service further provides a message updating page for the user to update content of the event data, and each of the event data comprises location information, time information and content information, and the step of transmitting the message comprises:

determining, by the transmitting module, whether a location and time of the mobile device match the location information and the time information of one of the event data to decide whether to transmit the message.

22. The non-transitory computer readable storage medium of claim 21, wherein the information processing method further comprises:

providing, by a data collecting unit in the register module, a coding package for a personal host corresponding to the user to collect original data in the personal host; and storing the original data in the database to update the event data, wherein the step of transmitting the message comprises:

displaying, by the first application program launched by the mobile device, the message page according to the website, wherein the coding package is configured to be executed on the personal host to transmit the original data to the database, and correspond the personal host to the website.

* * * * *